(12) United States Patent
Stehman et al.

(10) Patent No.: US 9,957,061 B2
(45) Date of Patent: *May 1, 2018

(54) SYSTEM AND METHOD OF NOTIFICATION OF AN AIRCRAFT CARGO FIRE WITHIN A CONTAINER

(71) Applicant: United Parcel Service of America, Inc., Atlanta, GA (US)

(72) Inventors: Keith M. Stehman, Louisville, KY (US); Richard S. Fisher, Crestwood, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/704,284

(22) Filed: Sep. 14, 2017

(65) Prior Publication Data

US 2018/0022470 A1    Jan. 25, 2018

Related U.S. Application Data

(63) Continuation of application No. 13/296,563, filed on Nov. 15, 2011, now Pat. No. 9,796,480.

(51) Int. Cl.
*B64D 45/00* (2006.01)
*A62C 3/08* (2006.01)
(Continued)

(52) U.S. Cl.
CPC ............... *B64D 45/00* (2013.01); *A62C 3/08* (2013.01); *G08B 5/36* (2013.01); *G08B 5/38* (2013.01); *B64D 2045/009* (2013.01)

(58) Field of Classification Search
CPC .... B64D 45/00; B64D 2045/009; A62C 3/08; G08B 5/36; G08B 5/38
See application file for complete search history.

(56) References Cited

U.S. PATENT DOCUMENTS

| 4,643,260 A | 2/1987 | Miller |
| 4,763,115 A | 8/1988 | Cota |

(Continued)

FOREIGN PATENT DOCUMENTS

| CA | 2834562 A1 | 12/2012 |
| CN | 1514743 A | 7/2004 |

(Continued)

OTHER PUBLICATIONS

United States Patent and Trademark Office, Office Action for U.S. Appl. No. 13/296,563, dated Jun. 28, 2013, 16 pages, USA.

(Continued)

*Primary Examiner* — Joseph Feild
*Assistant Examiner* — Sara Samson
(74) *Attorney, Agent, or Firm* — Shook, Hardy & Bacon L.L.P.

(57) ABSTRACT

Various embodiments of the present invention provide a system and method for notifying a flight crew of a fire condition in a cargo container of an aircraft. For instance, particular embodiments involve installing at least one notification device on a cargo container that is in communication with at least one of a fire-detection system or a fire-suppression system for the cargo container. In these particular embodiments, the notification device is configured to emit energy when the fire-detection system detects the fire condition in the cargo container or the fire-suppression system activates as a result of the fire condition. Further, particular embodiments of the invention involve installing at least one detector positioned to detect the energy emitted by the notification device. In these particular embodiments, the detector is configured to send a signal to notify the flight crew of the fire condition after detecting the energy emitted by the notification device.

20 Claims, 2 Drawing Sheets

(51) Int. Cl.
*G08B 5/36* (2006.01)
*G08B 5/38* (2006.01)

(56) References Cited

U.S. PATENT DOCUMENTS

| | | |
|---|---|---|
| 5,062,151 A | 10/1991 | Shipley |
| 5,822,544 A | 10/1998 | Chaco et al. |
| 6,003,608 A | 12/1999 | Cunningham |
| 6,029,751 A | 2/2000 | Ford et al. |
| 6,518,878 B1 | 2/2003 | Skoff |
| 6,721,640 B2 | 4/2004 | Glenn et al. |
| 6,899,184 B2 | 5/2005 | Reynolds |
| 7,066,274 B2 | 6/2006 | Lazzarini |
| 7,456,750 B2 | 11/2008 | Popp et al. |
| 7,501,958 B2 | 3/2009 | Saltzstein et al. |
| 7,592,916 B2 | 9/2009 | Staples |
| 8,054,200 B1 | 11/2011 | Nelson |
| 8,322,658 B2 | 12/2012 | Gershzohn et al. |
| 8,863,856 B2 | 10/2014 | Eckholm et al. |
| 9,555,271 B2 | 1/2017 | Ransom, Jr. |
| 2001/0054964 A1 | 12/2001 | Popp et al. |
| 2004/0020665 A1 | 2/2004 | Gupta |
| 2004/0163826 A1 | 8/2004 | Spring |
| 2008/0257566 A1 | 10/2008 | Shattuck |
| 2008/0314603 A1 | 12/2008 | Lazzarini |
| 2009/0038811 A1 | 2/2009 | Wagner |
| 2010/0236796 A1 | 9/2010 | Chattaway et al. |
| 2011/0048747 A1 | 3/2011 | Gastonides et al. |
| 2011/0240798 A1 | 10/2011 | Gershzohn et al. |
| 2012/0168184 A1 | 7/2012 | Enk, Sr. |
| 2012/0318537 A1 | 12/2012 | Ransom, Jr. |
| 2013/0000927 A1 | 1/2013 | Miller |
| 2013/0120162 A1 | 5/2013 | Stehman et al. |
| 2014/0151072 A1 | 6/2014 | Stehman et al. |
| 2015/0075823 A1 | 3/2015 | Meier et al. |

FOREIGN PATENT DOCUMENTS

| | | |
|---|---|---|
| CN | 101801467 A | 8/2010 |
| CN | 101843963 A | 9/2010 |
| CN | 102000406 A | 4/2011 |
| EP | 2740517 A2 | 6/2014 |
| EP | 2720760 B1 | 7/2015 |
| GB | 2374007 A | 10/2002 |

OTHER PUBLICATIONS

United States Patent and Trademark Office, Office Action for U.S. Appl. No. 13/296,563, filed Feb. 18, 2015, 29 pages, USA.
United States Patent and Trademark Office, Office Action for U.S. Appl. No. 13/296,563, dated Feb. 5, 2014, 27 pages, USA.
United States Patent and Trademark Office, Office Action for U.S. Appl. No. 13/296,563, dated Feb. 17, 2016, 25 pages, USA.
United States Patent and Trademark Office, Office Action for U.S. Appl. No. 13/296,563, dated Aug. 18, 2015, 29 pages, USA.
United States Patent and Trademark Office, Office Action for Application No. 13/296,563, dated Jun. 16, 2014, 23 pages, USA.
United States Patent and Trademark Office, Office Action for Application No. 13/296,563, dated Dec. 7, 2016, 28 pages, USA.
Notice of Allowance and Fees Due (PTOL-85) dated Jun 21, 2017 for U.S. Appl. No. 13/296,563.
International Searching Authority, International Search Report and Written Opinion for International Application No. PCT/US2012/035928, dated Apr. 3, 2013, 11 pages, European Patent Office, The Netherlands.
International Preliminary Examining Authority, International Preliminary Report on Patentability for International Application No. PCT/US2012/035928, dated Sep. 24, 2013, 7 pages, European Patent Office, The Netherlands.
Napert, Greg, Class D to C Conversions: A Review of Cargo Fire Detection and Suppression Requirements, Nov. 1, 1999, Aviation Pros, http://www.aviationpros.com/article/10388905/class-d-to-c-conversions-a-review-of-cargo-fire-detection-suppression-requirements.

SYSTEM AND METHOD OF NOTIFICATION OF AN AIRCRAFT CARGO FIRE WITHIN A CONTAINER

CROSS-REFERENCE TO RELATED APPLICATIONS

This application is a continuation of U.S. application Ser. No. 13/296,563, filed Nov. 15, 2011, the content of which is incorporated by reference herein in its entirety.

BACKGROUND OF THE INVENTION

One of the most hazardous situations a flight crew can face is a fire while the aircraft is airborne. Without aggressive intervention by the flight crew and/or fire-suppression system installed on the aircraft, an onboard fire during flight can lead to a catastrophic loss of the aircraft within a very short time. Today, many of the cargo containers used on aircraft have fire-suppression systems to deal with a fire that may occur in one or more of the cargo containers. Such fire-suppression systems typically disperse an extinguishing agent (e.g., liquefied gas) such as Halon 1211, Halon 1301, or combination thereof to suppress the fire.

In many instances, it is helpful to notify the crew of the aircraft quickly when a fire is detected and the fire-suppression system has discharged. This is because another tactic typically employed if a fire is detected on an aircraft during flight is to land the aircraft as-soon-as-possible. Therefore, a need exists in the art for an improved system and method for notifying the crew when a fire is detected in one or more cargo containers during flight.

SUMMARY OF VARIOUS EMBODIMENTS OF THE INVENTION

Various embodiments of the invention provide a system and method for notifying a flight crew of a fire condition in a cargo container on an aircraft. For instance, various embodiments of the invention involve installing at least one strobe light in communication with at least one of a fire-detection system or a fire-suppression system for the cargo container. In particular embodiments, the strobe light is mounted on the exterior roof of the cargo container and is configured to emit infrared energy when at least one of the fire-detection system detects the fire condition in the cargo container or the fire-suppression system activates as a result of the fire condition in the cargo container.

Further, various embodiments of the invention involve installing at least one infrared detector on the aircraft and positioned to detect the infrared energy emitted by the strobe light. In these particular embodiments, the infrared detector is configured to send a signal to notify the flight crew of the fire condition in the cargo container after detecting the infrared energy emitted by the at least one strobe light.

In addition, other embodiments of the present invention provide a system and method for notifying a flight crew of a fire condition in a cargo container of an aircraft that involve installing at least one notification device on the cargo container that is in communication with at least one of a fire-detection system or a fire-suppression system for the cargo container. In these particular embodiments, the notification device is configured to emit energy when at least one of the fire-detection system detects the fire condition in the cargo container or the fire-suppression system activates as a result of the fire condition in the cargo container.

In particular embodiments, the emitted energy is not a wireless electrical transmission, a cellular transmission, or a radio frequency transmission. For instance, in particular embodiments, the emitted energy is at least one of infrared light, visible light, ultrasound, or acoustic sound. Further, in particular embodiments, the notification device is mounted to the exterior of the cargo container. For instance, in one particular embodiment, the notification device is mounted on the exterior roof of the cargo container.

Furthermore, various embodiments of the invention involve installing at least one detector positioned to detect the energy emitted by the notification device. For instance, in particular embodiments, the detector is attached to the aircraft. In these particular embodiments, the detector is configured to send a signal to notify the flight crew of the fire condition in the cargo container after detecting the energy emitted by the notification device.

In particular embodiments, the signal sent to notify the flight crew may cause an alarm to sound. In other embodiments, the signal sent to notify the flight crew may cause an indicator light to come on. Yet, in other embodiments, the signal sent to notify the flight crew may cause a message to flash across a display. Finally, in particular embodiments, the signal sent to notify the flight crew may cause information on the activation of the fire-suppression system to be recorded and/or communicated to ground personnel.

BRIEF DESCRIPTION OF THE SEVERAL VIEWS OF THE DRAWINGS

Figure 1:
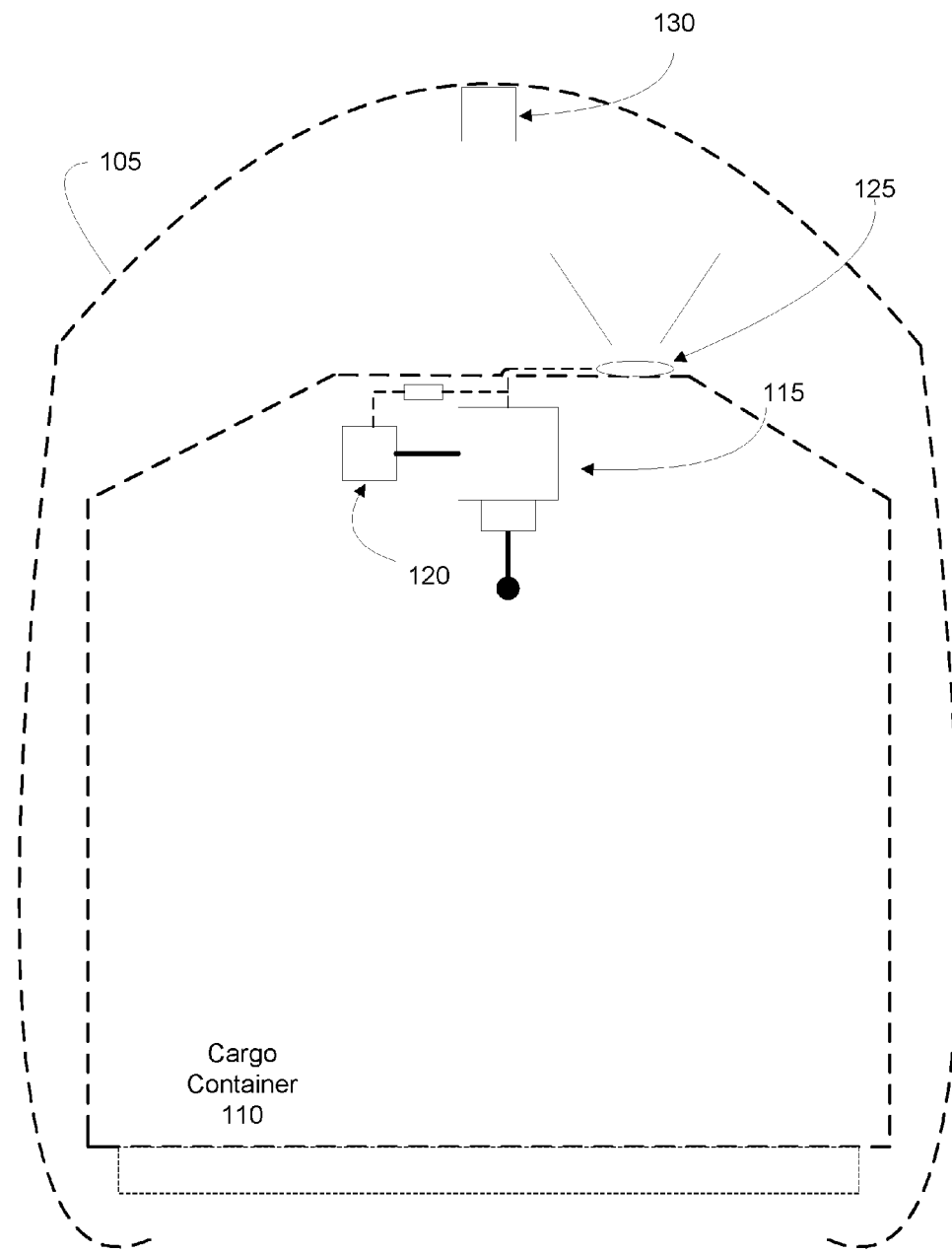

Having thus described the invention in general terms, reference will now be made to the accompanying drawings, which are not necessarily drawn to scale, and wherein:

FIG. 1 illustrates a schematic view of a cargo container mounted fire-suppression system and notification system according to an embodiment of the invention.

Figure 2:
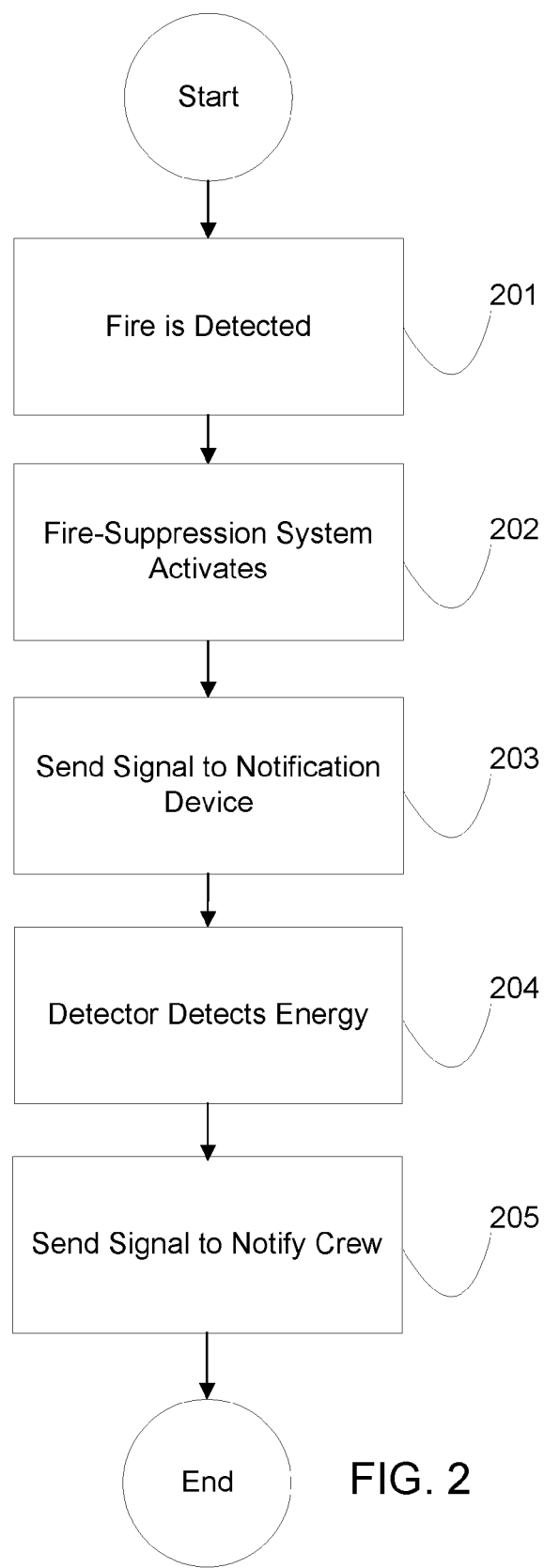

FIG. 2 illustrates a method of notifying the flight crew of a fire according to an embodiment of the invention.

DETAILED DESCRIPTION OF VARIOUS EMBODIMENTS OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

An Exemplary Embodiment of the System

FIG. 1 illustrates a schematic view of a notification system that may be used in conjunction with a cargo container fire-suppression system according to an embodiment of the invention. Many of the features, dimensions, and other specifications shown in the figure are merely illustrative of the particular embodiments of the invention for purposes of this disclosure. Accordingly, other embodiments may have other features, dimensions, and specifications. In addition, other embodiments of the invention may be practiced without various features as described below.

The cargo container 110 of the aircraft 105 is configured to store and transport cargo (e.g., shipments, packages, pallets, etc.) of varying shapes and sizes. For instance, in various embodiments, the cargo container 110 may be a unit load device (ULD) used to load and ship luggage, freight, and/or mail on the aircraft 105. As shown in FIG. 1, the cargo container fire-suppression system 115 may be in communication with a fire-detection system 120 that may be comprised of one or more fire detectors configured to provide a signal to the fire-suppression system 115 in response to detecting an actual or potential fire condition in a portion of the cargo container 110 such as, for instance, detecting the presence of heat, smoke, combustion products, or combination thereof. In particular embodiments, these fire detectors may be placed throughout the cargo container 110. In particular embodiments, the cargo container fire-suppression system 115 is configured to disperse an extinguishing agent into the cargo container 110 upon activation in order to extinguish flames that may be present.

According to various embodiments, the notification system includes one or more notification devices 125 mounted to the exterior roof of the cargo container 110. In particular embodiments, the notification devices 125 are configured to emit some type of energy such as infrared light, laser light, visual light, ultrasound, and/or acoustic sound. For instance, in one embodiment, the notification devices 125 are infrared strobe lights in electronic communication with the fire-suppression system 115. However, in other embodiments, the notification devices 125 may be other devices such as lasers, fluorescent lights, ultrasonic transducers, or speakers. Although in exemplary embodiments, the devices are not any type of device that emits forms of wireless transmissions such as electrical, cellular, or radio frequency.

Therefore upon activation, the fire-suppression system 115 (and/or fire-detection system 120) sends a signal to the notification devices 125 that the fire-suppression system 115 has activated (and/or the fire-detection system 120 has detected a fire condition). In response, the notification devices 125 emit energy. For instance, in the case in which the notification devices 125 are infrared strobe lights, the infrared strobe lights emit energy as infrared light. In the case in which the notification devices 125 are ultrasonic transducers, the transducers emit energy as ultrasound. In the case in which the notification devices 125 are speakers, the speakers emit energy as sound.

Further, in various embodiments, the notification system also includes one or more detectors 130 mounted throughout the aircraft 105. For instance, in one embodiment, the detectors 130 are mounted along the spine of the aircraft 105. In these particular embodiments, the detectors 130 are tuned to a frequency/emission level/vibration level/volume level at which the notification devices 125 are emitting energy. For example, in instances in which the notification devices 125 are infrared strobe lights, the detectors 130 are set to the strobe frequency the strobe lights 125 emit energy. In another example in which the notification devices 125 are speakers, the detectors 130 are set to detect a volume threshold corresponding to the volume of sound the speakers emit. Therefore, as a result, the detectors 130 detect the energy emitted by the notification devices 125.

In addition, in particular embodiments, the detectors 130 are in electronic communication with a crew notification system (not pictured in FIG. 1). Thus, as a result of detecting energy, the detectors 130 send a signal to the crew notification system and the system notifies the crew of the activation of the fire-suppression system 115 and/or detection of the fire condition. According to various embodiments, the crew notification system may provide notifications using one or more different types of mechanisms. For instance, in one embodiment, the crew notification system may sound an alarm in the cockpit of the aircraft 105 and/or may light an indicator light located on the controls of the aircraft 105. One of ordinary skill in the art can envision several types of mechanisms that may be used to notify the crew in light of this disclosure.

In addition, in particular embodiments, the crew notification system may communicate with other components and/or systems of the aircraft. For instance, in one embodiment, the crew notification system may communicate with the aircraft's ACARS so that the activation of the fire-suppression system 115 may be recorded and/or communicated to ground personnel.

Exemplary Method for Notifying of a Fire within a Container

FIG. 2 provides a method for notifying the crew of an aircraft of a fire condition within a container according to various embodiments of the invention. FIG. 2 begins with the step of detecting a presence of an actual or potential fire condition in a portion of the cargo container 110, shown as Step 201. For instance, in particular embodiments, a fire condition is detected in the cargo container 110 of the aircraft by a fire-detection system 120 that may include an automatic device such as one or more fire detectors located throughout the cargo container 110. In various embodiments, one or more of the fire detectors send a signal to the cargo container fire-suppression system 115.

In response, the fire-suppression system 115 activates and releases a discharge of extinguishing agent into the cargo container 110, shown as Step 202. After the initial discharge of the extinguishing agent has been released into the cargo container 110, in various embodiments, the fire-suppression system 115 sends a signal to one or more notification devices 125, shown as Step 203. It should be noted that in particular embodiments, the fire-detection system 120 may send the signal to the one or more notification devices 125 in addition to or instead of the fire-suppression system 115.

Further, it should be noted that various embodiments make use of a configuration in which the notification devices 125 are located on the exterior of the cargo container 110. Such a configuration may be beneficial because the energy emitted by the devices 125 is less likely to be inhibited by objects placed in the container 110 and/or smoke that may be generated by a fire in the container 110. For instance, in one embodiment, the one or more notification devices 125 are located on the exterior roof of the cargo container 110 however they may be placed at other exterior locations or inside the container if desired.

In response to receiving the signal from the fire-suppression system 115 and/or fire-detection system 120, the one or more notification devices 125 activate and emit energy. For example, in instances in which the notification devices 125 are strobe lights or fluorescent lights, the devices 125 emit energy as infrared light or visible light. In another example, in instances in which the notification devices 125 are ultrasonic transducers or speakers, the devices 125 emit energy as ultrasound or acoustic sound. As previously described, in various embodiments, the aircraft 105 may be equipped with detectors 130 placed throughout the aircraft 105 that are in positions to detect the energy emitted from the one or more notification devices 125. For instance, in various embodiments, the detectors 130 may be installed along the spine of the aircraft 105 so that the detectors 130 are at a high point, making it easier to detect the emitted energy from the notification devices 125. In other embodiments, the detectors 130 may be installed in other locations such as the aircraft walls or drop floor/ceiling placed between the passenger compartment and the storage compartment on various aircraft 105. Thus, in Step 204, one or more of the detectors 130 detect the energy being transmitted from one or more of the notification devices 125 and send a signal to notify the crew, shown as Step 205.

The notification may be provided in a variety of ways according to various embodiments. For instance, in one embodiment, the one or more detectors 130 send a signal that causes an alarm to sound in the cockpit of the aircraft 105. Therefore, in this instance, the crew is alerted that a fire-suppression system 115 has discharged in one or more of the cargo containers 110. In other embodiments, the signal sent by the detectors 130 may warn the crew of the aircraft using other mechanisms such as flashing a message across a display in the cockpit or a voice sounding from a speaker. In addition, the signal sent from the one or more detectors may include information to help determine which cargo containers 110 may have a fire condition. For example, the signal may include an identifier that identifies the detector 130 that has sent the signal. From this information, the crew may be able to determine what portion of the aircraft 105 has the container 110 with the fire condition and subsequently the container 110, itself.

Advantages of Various Embodiments

As mentioned, in various embodiments, the notification devices 125 are types of devices that emit energy such as infrared light, laser light, visible light, ultrasound, and/or acoustic sound. Thus, a distinct advantage provided by these particular embodiments of the invention is that the invention may be implemented on aircraft 105 without having to obtain approval from the Federal Aviation Administration (FAA) and/or Federal Communications Commission (FCC). In many instances, the FAA and/or FCC require a certification for many types of wireless transmissions that may occur during air flight such as electrical, cellular, and/or radio frequency transmissions. This is because such wireless transmissions may potentially adversely affect other systems on the aircraft 105. For example, such wireless transmissions may potentially adversely affect the navigational instruments in the cockpit of the aircraft 105.

However, the use of various embodiments of the invention does not involve the transmission of any such wireless signals. As mentioned, the only type of wireless activity is the emission of energy such as light or sound. Thus, various embodiments of the invention may be implemented in aircraft without having to go through the process of certification with the FAA and/or FCC and without the fear of causing any type of adverse interference with other systems on the aircraft 105.

In addition, another advantage realized is various embodiments of the invention may be practiced that allow the cargo container 110 to remain decoupled from the aircraft 105. That is, in various embodiments, the crew of the aircraft 105 may receive a notification that a fire-suppression system 115 has discharged in a cargo container 110 without the container 110 actually having to be physically coupled to the aircraft (e.g., hardwired to the aircraft). Therefore, various embodiments of the invention may be implemented with minimal alterations to the cargo containers 110 and/or aircraft. Further, various embodiments of the invention may be used with various cargo containers 110 that may be easily interchangeable with multiple aircraft 105.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for notifying a flight crew of a fire condition in a cargo container on an aircraft, the system comprising:
   at least one infrared light in communication with at least one of a fire-detection system or a fire-suppression system for the cargo container, the infrared light being mounted on an exterior roof of the cargo container and configured to emit infrared energy having a particular emission level when at least one of the fire-detection system detects the fire condition in the cargo container or the fire-suppression system activates as a result of the fire condition in the cargo container; and
   at least one infrared detector mounted on the aircraft and positioned to detect the infrared energy emitted by the at least one infrared light and configured to send a signal to notify the flight crew of the fire condition in the cargo container after detecting the infrared energy emitted by the at least one infrared light at the particular emission level.

2. The system of claim 1, wherein the infrared light is a strobe light, and the detector is set to a strobe frequency of the strobe light and is configured to detect the emitted infrared energy based in part on the strobe frequency.

3. The system of claim 1, wherein the signal sent by the infrared detector to notify the flight crew on the aircraft causes an indication of the cargo container in the aircraft in which at least one of (a) the fire-detection system detected the fire condition or (b) the fire-suppression system was activated as a result of the fire condition to be provided.

4. The system of claim 1, wherein the signal sent by the infrared detector to notify the flight crew on the aircraft of the fire condition causes at least one of (a) information on the activation of the fire-suppression system to be communicated to ground personnel or (b) information on the activation of the fire-suppression system to be recorded.

5. A system for notifying a flight crew of a fire condition in a cargo container on an aircraft, the system comprising:
   at least one notification device in communication with at least one of a fire-detection system or a fire-suppression system for the cargo container in which the at least one notification device is configured to emit energy having a particular characteristic when at least one of the fire-detection system detects the fire condition in the cargo container or the fire-suppression system activates as a result of the fire condition in the cargo container; and
   at least one detector positioned to detect the energy emitted by the at least one notification device at the particular characteristic and configured to send a signal to notify the flight crew of the fire condition in the cargo container after detecting the energy emitted by the at least one notification device, and
   wherein (a) the emitted energy is at least one of infrared light, laser light, visible light, vibration, or ultrasonic signal and (b) the particular characteristic is an emission level when the emitted energy is infrared light, laser light, or visible light and the particular characteristic is a vibration level when the emitted energy is a vibration or ultrasonic signal.

6. The system of claim 5, wherein the at least one notification device comprises an infrared strobe light configured to emit the energy as infrared light.

7. The system of claim 5, wherein the signal sent to notify the flight crew causes an indication of the cargo container in the aircraft in which at least one of (a) the fire-detection system detected the fire condition or (b) the fire-suppression system was activated as a result of the fire condition to be provided.

8. The system of claim 5, wherein the at least one notification device is attached to an exterior of the cargo container and the at least one detector is attached to the aircraft.

9. The system of claim 5, wherein the at least one notification device is mounted on the exterior roof of the cargo container.

10. The system of claim 5, wherein the signal sent to notify the flight crew causes an alarm to sound.

11. The system of claim 5, wherein the signal sent to notify the flight crew causes an indicator light to come on.

12. The system of claim 5, wherein the signal sent to notify the flight crew causes a message to flash across a display.

13. The system of claim 5, wherein the signal sent to notify the flight crew causes at least one of (a) information on the activation of the fire-suppression system to be communicated to ground personnel or (b) information on the activation of the fire-suppression system to be recorded.

14. A method for notifying a flight crew of a fire condition in a cargo container on an aircraft, the method comprising the steps of:
    emitting energy having a particular characteristic from at least one notification device in communication with at least one of a fire-detection system or a fire-suppression system for the cargo container after at least one of the first-detection system detecting the fire condition in the cargo container or the fire-suppression system activating as a result of the fire condition in the cargo container;
    detecting the emitted energy by at least one detector positioned to detect the energy emitted by the at least one notification device at the particular characteristic; and
    sending a signal by the at least one detector to notify the flight crew of the fire condition in the cargo container,
    wherein (a) the emitted energy is at least one of infrared light, laser light, visible light, vibration, or ultrasonic signal and (b) the particular characteristic is an emission level when the emitted energy is infrared light, laser light, or visible light and the particular characteristic is a vibration level when the emitted energy is a vibration or ultrasonic signal.

15. The method of claim 14, wherein the at least one notification device comprises at least one infrared light attached to an exterior of the cargo container and the at least one detector is attached to the aircraft.

16. The method of claim 14, wherein the at least one notification device is mounted on the exterior roof of the cargo container.

17. The method of claim 14, wherein the signal sent to notify the flight crew causes at least one of an alarm to sound, an indicator light to come on, or a message to flash across a display.

18. The method of claim 14, further comprising:
    communicating information on the activation of the fire-suppression system to ground personnel.

19. The method of claim 14, wherein:
    the at least one notification device comprises an infrared strobe light; and
    emitting the energy further comprises emitting the energy from the infrared strobe light as infrared light.

20. The method of claim 14, wherein the signal sent by the detector to notify the flight crew on the aircraft of the fire condition causes at least one of (a) information on the activation of the fire-suppression system to be communicated to ground personnel or (b) information on the activation of the fire-suppression system to be recorded.

* * * * *